United States Patent [19]

Yano et al.

[11] Patent Number: 4,617,372

[45] Date of Patent: Oct. 14, 1986

[54] PROCESS FOR PRODUCING POLYPHENYLENE ETHER

[75] Inventors: Kazunori Yano; Teruhisa Goto; Katsuhiro Abe, all of Mie, Japan

[73] Assignee: Mitsubishi Petrochemical Co, Ltd., Tokyo, Japan

[21] Appl. No.: 800,033

[22] Filed: Nov. 20, 1985

[51] Int. Cl.$^4$ .............................................. C08G 65/44
[52] U.S. Cl. ................................... 528/216; 528/212; 528/214; 528/215; 528/217; 528/218
[58] Field of Search .......................... 528/212, 214–218

[56] References Cited

U.S. PATENT DOCUMENTS

| | | |
|---|---|---|
| 3,134,753 | 5/1964 | Kwiatek ............................... 528/216 |
| 3,313,776 | 4/1967 | Borman ................................ 528/216 |
| 3,442,885 | 5/1969 | Wieden et al. ....................... 528/216 |
| 3,491,058 | 1/1970 | Taylor et al. ........................ 528/216 |
| 4,184,034 | 1/1980 | Olander ............................... 528/216 |

*Primary Examiner*—Lester L. Lee
*Attorney, Agent, or Firm*—Oblon, Fisher, Spivak, McClelland & Maier

[57] ABSTRACT

Polyphenylene ethers are produced by oxidative polymerization of phenols in the presence of a catalyst comprising the combination of divalent manganese salts, an oxine or derivatives thereof, an alkanolamine, and an alkaline compound. This catalyst has an increased polymerization activity and achieves a higher productivity. In addition, the catalyst enables the polymerization to conduct at relatively high temperatures.

15 Claims, No Drawings

PROCESS FOR PRODUCING POLYPHENYLENE ETHER

FIELD OF THE INVENTION

The present invention relates to a process for producing a polyphenylene ether by oxidative polymerization of phenols. More particularly, the present invention relates to a process for polymerization of phenols using divalent manganese salts as catalyst components.

BACKGROUND OF THE INVENTION

Polyphenylene ethers are engineering plastics and, when blended with other resins, provide unique characteristics which make the blends useful in various applications.

Methods for producing polyphenylene ethers by oxidative polymerization of phenols are well known, and the polyphenylene ethers are generally obtained by reacting phenols with oxygen in the presence of a catalyst system composed of a combination of manganese salts or copper salts and certain ligands typified by amines. Methods using manganese salts as a catalyst are described in, for example, Japanese Patent Publication Nos. 21894/1984, 23297/1980 and 31919/1978. Methods using copper salts as a catalyst are described in, for example, Japanese Patent Publication Nos. 23332/1984, 44353/1978 and 34832/1980.

One problem involved in these prior art methods is that during the oxidative polymerization of phenols, diphenoquinone forms as a by-product and this results in coloration of the polymer produced. Therefore, post-treatments such as extraction with solvents and washing are required, leading to increase production costs. Further problems are that since the yield of polyphenylene ether produced per unit amount of the catalyst is low, the expensive catalyst must be used in a large amount and to remove the residual catalyst (e.g., Mn salt or Cu salt) contained in the polymer product of polyphenylene ether, complicated post-treatments are required. In addition, the oxidative polymerization of phenols is an exothermic reaction and the reactor must be equipped with an apparatus for removing the heat of polymerization in the production of polyphenylene ether. Needless to say, higher temperatures of polymerization reaction are advantageous to remove the heat of polymerization. However, it is difficult in the conventional methods to increase the polymerization reaction temperature, and the polymerization reaction temperature of the conventional methods which use manganese salts as a catalyst is 25° to 30° C. Therefore, the conventional methods require not only an expensive apparatus for removing the heat of polymerization but also a complicated polymerization reactor, resulting in increasing the production costs.

SUMMARY OF THE INVENTION

The present inventors have made extensive investigations on the process for producing polyphenylene ethers by oxidative polymerization of phenols to develop a catalyst system which minimizes the formation of the by-product diphenoquinone, provides a higher catalytic yield (i.e., an increased amount of the polyphenylene ether produced per unit amount of catalyst) and enables the polymerization of phenols at high temperatures.

As a result, it has been found that a catalyst system composed of a divalent manganese salt in combination with a certain oxine or derivative thereof, an alkanolamine and an alkaline compound is effective to attain the above object. It has been further found that use of copper salts instead of the manganese salts is not effective and only the combination of a manganese salt, an oxine or derivative thereof, an alkanolamine and an alkaline compound is particularly effective as the catalyst system in the oxidative polymerization of phenols. The present invention has been accomplished on the basis of these findings.

Accordingly, an object of the present invention is to provide a process for producing a polyphenylene ether by oxdative polymerization of phenols in the presence of a catalyst, wherein the catalyst is a catalyst system comprising divalent manganese salts, an oxine or a derivative thereof of the formula:

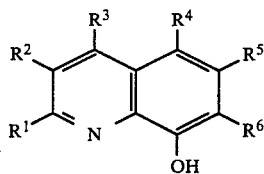

wherein $R^1$, $R^2$, $R^3$, $R^4$, $R^5$ and $R^6$ each is a hydrogen atom, an alkyl group having 1 to 5 carbon atoms, an alkoxy group having 1 to 5 carbon atoms, a halogen atom, a hydroxyl group, a nitro group or an amino group, an alkanolamine and an alkaline compound.

DETAILED DESCRIPTION OF THE INVENTION

The phenols which can be used as the starting material in the process of the present invention are a compound represented by the formula:

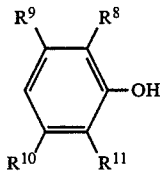

wherein $R^8$, $R^9$, $R^{10}$ and $R^{11}$ each is a hydrogen atom, a halogen atom, a hydrocarbon residue (preferably an alkyl group having 1 to 12 carbon atoms), a halohydrocarbon residue (preferably a haloalkyl group having 1 to 12 carbon atoms), a hydrocarbon oxy group (preferably an alkoxy group having 1 to 12 carbon atoms), or a halohydrocarbon oxy group (preferably a haloalkoxy group having 1 to 12 carbon atoms). Examples of the phenols represented by the above formula include 2,6-dimethylphenol, 2-methyl-6-ethylphenol, 2,6-diethylphenol, 2-methyl-6-n-propylphenol, 2,6-dimethoxyphenol, 2-methyl-6-methoxyphenol and 2,6-diphenylphenol. A typical example thereof is 2,6-dimethylphenol. These phenols can be used alone or as mixtures thereof in any desired proportions.

Examples of the divalent manganese salts which can be used in the present invention include manganese (II) chloride, manganese (II) bromide, manganese (II) iodide, manganese (II) carbonate, manganese (II) acetate, manganese (II) nitrate, manganese (II) phosphate and hydrated compounds of these manganese salts. Preferred manganese salts are manganese (II) chloride and manganese (II) bromide. The amounts of divalent manganese salts used are not particularly limited, but are generally from 0.001 to 1 mol % and preferably from 0.01 to 0.1 mol %, per mole of phenol.

The oxine or derivatives thereof used in the present invention are represented by the formula:

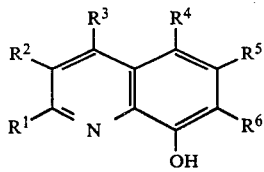

wherein $R^1$, $R^2$, $R^3$, $R^4$, $R^5$ and $R^6$ each is a hydrogen atom, an alkyl group having 1 to 5 carbon atoms, an alkoxy group having 1 to 5 carbon atoms, a halogen atom, a hydroxyl group, a nitro group or an amino group. Examples of the oxine and derivatives thereof include oxine, 5-methyloxine, 5-methoxyoxine, 5-ethyloxine, 5-chloroxine, 5-hydroxyoxine, 5-nitroxine, 5-aminoxine and 2-methyloxine. Of these, 5-methyloxine is preferred. The amount thereof is generally at least 0.05 mole, preferably 0.07 to 5 moles, and more preferably 0.08 to 3 moles, per mole of the manganese (II) salts. Typically, 2 moles of the oxine or derivatives thereof per mole of the manganese (II) salts are used.

The alkanolamine which can be used in the present invention is a compound represented by the formula: $H_{3-n}N.(R^7OH)_n$ wherein $R^7$ is an alkylene group having 1 to 4 carbon atoms; and n is an integer of 1 to 3. Examples of the alkanolamine include methanolamine, dimethanolamine, trimethanolamine, ethanolamine, di-ethanolamine, triethanolamine, isopropanolamine, di-isopropanolamine, tri-isopropanolamine, n-butanolamine, di-n-butanolamine and tri-n-butanolamine. Of those, ethanolamine and di-ethanolamine are preferred. The amount of alkanolamine used is not particularly limited, but is generally from 10 to 500 moles and preferably from 50 to 200 moles, per mole of the manganese (II) salts.

Examples of the alkaline compound which can be used in the present invention are sodium hydroxide, potassium hydroxide, and sodium methoxide. The alkaline compound is generally used in an amount ranging from 1 to 20 mol % and preferably from 3 to 10 mol %, per mole of the phenols. In the practice of the process of the present invention, primary, secondary or tertiary amine compounds may be used as a cocatalyst in combination with the catalyst described above.

The catalyst used in the present invention is prepared by a method comprising dissolving the divalent manganese salts in alcohols such as methanol, adding the oxine or derivative thereof, the alkanolamine and the alkaline compound and stirring the resulting mixture.

Examples of the organic solvent suitable for use in the polymerization reaction are aromatic hydrocarbons (e.g. benzene, toluene and xylene) and halogenated hydrocarbons (e.g. chloroform and methylene chloride). These organic solvents can be mixed with polar solvents such as methanol, ethanol, propanol and butanol. If such mixed reaction solvents are used, the proportion of the polar solvent is preferably 80 vol % or less. The oxidizing agent for oxidative polymerization is either oxygen or air. There is no particular limitation on the reaction temperature, but the temperature is generally 0° to 100° C. and preferably 40° to 70° C. The reaction time varies depending on the concentration of catalyst, the reaction temperature and the type of oxidizing agent used, but is generally 1 to 4 hours.

As described above, in the process for producing polyphenylene ethers by oxidative polymerization of phenols according to the present invention, a catalyst composed of the combination of divalent manganese salts, oxine or derivatives thereof, alkanolamine and alkaline compound is used. This manganese salt based catalyst is particularly effective to minimize the formation of the by-product diphenoquinone and attain a higher catalytic yield, and at the same time, the catalyst enables the polymerization reaction to conduct at relatively high temperatures, so that the heat of polymerization can be easily removed.

The present invention is now explained in greater detail by reference to the following non-limiting examples.

EXAMPLE 1

A 1,000 ml four-necked flask was charged with 30 ml of methanol and 0.0495 g ($2.5 \times 10^{-4}$ mol) of $MnCl_2.4H_2O$. Thereafter, 0.0725 g ($5 \times 10^{-4}$ mol) of oxine dissolved in 120 ml of methanol, 2.44 g ($4 \times 10^{-2}$ mol) of ethanolamine and aqueous sodium hydroxide solution ($2.5 \times 10^{-2}$ mol as NaOH) were added thereto and the resulting mixture was stirred to prepare a catalyst. Then, 100 g (0.82 mol) of 2,6-di-methylphenol dissolved in 350 ml of benzene was poured into the flask, and reaction was conducted at 60° C. under stirring while supplying oxygen. After reaction of 2 hours, 5 ml of acetic acid was added to inactivate the catalyst and complete the reaction. To the resulting reaction mixture, methanol was added to form a polymer slurry. The slurry was filtered and the residue was dried in a dryer for 24 hours under a reduced pressure to obtain 98.0 g of polyphenylene ether having an intrinsic viscosity [η] of 0.410 as measured in chloroform at 25° C. The amount of the by-product diphenoquinone, as measured at absorbance of 420 mμ, was 100 ppm or less. The catalyst system and the reaction temperature used in Example 1, as well as the reaction products obtained, are shown in Table 1.

EXAMPLES 2 to 6 and COMPARATIVE EXAMPLES 1 to 8

Oxidative polymerization of 2,6-di-methylphenol was conducted in the same manner as in Example 1 except that the types and amounts of metal salts, oxine or its derivatives and alkanolamines used as catalyst components, the amount of sodium hydroxide added, and the reaction temperature were changed as shown in Table 1, and dibutylamine was used as a cocatalyst. The amounts of polyphenylene ethers produced, their intrinsic viscosities [η], and the amounts of the by-product diphenoquinone are shown in Table 1.

TABLE 1

| | Catalyst System | | | |
|---|---|---|---|---|
| Metal salt | Oxine or derivative thereof | Alkanolamine | Sodium hydroxide | Dibutyl-amine |
| Amount | Amount | Amount | Amount | Amount |

TABLE 1-continued

|  | Type | (mol) | Type | (mol) | Type | (mol) | (mol) | (mol) |
|---|---|---|---|---|---|---|---|---|
| Example 1 | $MnCl_2.4H_2O$ | $2.5 \times 10^{-4}$ | Oxine | $5 \times 10^{-4}$ | Ethanolamine | $4 \times 10^{-2}$ | $5 \times 10^{-2}$ | — |
| Example 2 | " | " | " | " | " | " | " | $5 \times 10^{-3}$ |
| Example 3 | " | " | " | " | Diethanolamine | $2 \times 10^{-2}$ | " | — |
| Example 4 | $MnBr_2.4H_2O$ | " | " | " | " | " | " | — |
| Example 5 | " | " | 5-Methyloxine | " | " | " | " | $5 \times 10^{-3}$ |
| Example 6 | $MnCl_2.4H_2O$ | " | 5-Ethyloxine | " | Ethanolamine | $4 \times 10^{-2}$ | " | — |
| Comparative Example 1 | " | $5 \times 10^{-4}$ | Oxine | $1 \times 10^{-3}$ | — | — | " | — |
| Comparative Example 2 | " | " | 5-Methyloxine | " | — | — | " | — |
| Comparative Example 3 | " | $2.5 \times 10^{-4}$ | Oxine | $5 \times 10^{-4}$ | — | — | " | — |
| Comparative Example 4 | " | " | — | — | Ethanolamine | $4 \times 10^{-2}$ | " | — |
| Comparative Example 5 | $CuBr_2$ | $1.5 \times 10^{-2}$ | — | — | — | — | " | $4.5 \times 10^{-2}$ |
| Comparative Example 6 | " | " | Oxine | $3 \times 10^{-2}$ | — | — | " | " |
| Comparative Example 7 | $MnCl_2.4H_2O$ | $2.5 \times 10^{-4}$ | " | $5 \times 10^{-4}$ | Ethanolamine | $4 \times 10^{-2}$ | — | — |
| Comparative Example 8 | $CuBr_2$ | $1.5 \times 10^{-2}$ | " | $3 \times 10^{-2}$ | " | $1.5 \times 10^{-1}$ | $5 \times 10^{-2}$ | — |

|  | Reaction temperature (°C.) | Product Polyphenylene ether Amount (g) | Intrinsic viscosity | By-product (ppm) |
|---|---|---|---|---|
| Example 1 | 60 | 98.0 | 0.410 | 100 or less |
| Example 2 | " | 97.5 | 0.405 | " |
| Example 3 | " | 98.0 | 0.405 | " |
| Example 4 | " | 97.1 | 0.410 | " |
| Example 5 | " | 97.3 | 0.401 | " |
| Example 6 | " | 97.0 | 0.400 | " |
| Comparative Example 1 | 30 | 98.0 | 0.340 | 1,500 |
| Comparative Example 2 | " | 97.0 | 0.335 | 1,300 |
| Comparative Example 3 | 50 | 53.0 | 0.188 | 900 |
| Comparative Example 4 | " | 58.2 | 0.201 | 850 |
| Comparative Example 5 | " | 61.0 | 0.185 | 3,500 |
| Comparative Example 6 | " | 59.7 | 0.105 | 3,700 |
| Comparative Example 7 | " | 78.2 | 0.256 | 1,900 |
| Comparative Example 8 | " | 19.0 | 0.102 | 3,900 |

As is clear from Table 1 summarizing the results of Examples 1 to 6 and Comparative Examples 1 to 8, the catalyst systems comprising the combination of components specified in the present invention can increase catalytic yields (i.e., the amount of polyphenylene ether produced per unit amount of catalyst), and minimize the formation of the by-product diphenoquinone. In addition, these catalyst systems enable the polymerization reaction to conduct at relatively high temperatures, so that the heat of polymerization can be easily removed to reduce the production costs.

While the invention has been described in detail and with reference to specific embodiments thereof, it will be apparent to one skilled in the art that various changes and modifications can be made therein without departing from the spirit and scope thereof.

What is claimed is:

1. A process for producing a polyphenylene ether by oxidative polymerization of phenols in the presence of a catalyst, wherein said catalyst comprises an effective amount of each of:

(a) a divalent manganese salt selected from the group consisting of manganese (II) chloride, manganese (II) bromide, manganese (II) iodide, manganese (II) carbonate, manganese (II) acetate, manganese (II) nitrate, manganese (II) phosphate and hydrated compounds of the same;

(b) an oxine compound having the formula:

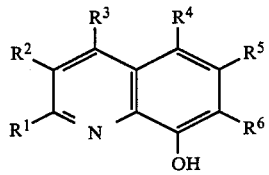

wherein $R^1$, $R^2$, $R^3$, $R^4$, $R^5$ and $R^6$ each is a hydrogen atom, an alkyl group having 1 to 5 carbon atoms, an alkoxy group having 1 to 5 carbon atoms, a halogen atom, a hydroxyl group, a nitro group or an amino group;

(c) an alkanolamine having the formula:

wherein $R^7$ is an alkylene group having 1 to 4 carbon atoms, and n is an integer of 1 to 3; and (d) an alkaline compound selected from the group consisting of sodium hydroxide, potassium hydroxide and sodium methoxide.

2. The process as in claim 1, wherein said oxine or derivative thereof is at least one member selected from the group consisting of oxine, 5-methyloxine, 5-hydroxyoxine, 5-nitroxine, 5-aminoxine and 2-methyloxine.

3. The process as in claim 1, wherein said oxine or derivative thereof is 5-methyloxine.

4. The process as in claim 1, wherein said alkanolamine is selected from the group consisting of ethanolamine, di-ethanolamine and the mixture thereof.

5. The process as in claim 1, wherein said catalyst is prepared by dissolving the divalent manganese salt in a lower alcohol, adding said oxine, said alkanolamine and said alkaline compound and then stirring said mixture.

6. The process as in claim 1, wherein the oxidative polymerization of phenol is carried out at a temperature of 40° to 70° C.

7. The process as in claim 1, wherein the amounts of the oxine or derivative thereof and the alkanolamine used are at least 1.0 mole and from 10 to 500 moles, per mole of the divalent manganese salts, respectively.

8. The process as in claim 1, wherein the amount of said alkaline compound is from 1 to 20 mol % per mole of the phenol.

9. The process as in claim 1, wherein said oxidative polymerization is conducted in the presence of oxygen or air, at a temperature in the range of 0° to 100° C. for a time of about 1 to 4 hours.

10. A process as in claim 1, wherein said phenols have the formula:

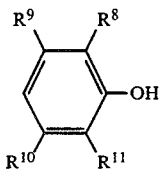

wherein $R^8$, $R^9$, $R^{10}$ and $R^{11}$ each is a hydrogen atom, a halogen atom, an alkyl group having 1 to 12 carbon atoms, a haloalkyl group having 1 to 12 carbon atoms, an alkoxy group having 1 to 12 carbon atoms or a haloalkoxy group having 1 to 12 carbon atoms.

11. The process as in claim 1, wherein said divalent manganese salt is used in the amount of 0.001 to 1 mole % per mole of phenol.

12. The process as in claim 1, wherein said oxine is used in the amount of at least 0.05 mole per mole of said manganese salts.

13. The process as in claim 12, wherein said oxine is used in the amount of 0.07 to 5 moles per mole of said manganese salts.

14. The process as in claim 1, wherein said alkanolamine is used in the amount of 10 to 500 moles per mole of the manganese salts.

15. The process as in claim 1, wherein said alkaline compound is used in an amount ranging from 1 to 20 mole % per mole of the phenol.

* * * * *